United States Patent [19]
Tuckey

[11] Patent Number: 5,509,390
[45] Date of Patent: Apr. 23, 1996

[54] TEMPERATURE-RESPONSIVE DEMAND FUEL PRESSURE REGULATOR

[75] Inventor: Charles H. Tuckey, Cass City, Mich.

[73] Assignee: Walbro Corporation, Cass City, Mich.

[21] Appl. No.: 403,186

[22] Filed: Mar. 13, 1995

Related U.S. Application Data

[63] Continuation-in-part of Ser. No. 181,848, Jan. 14, 1994, Pat. No. 5,458,104.

[51] Int. Cl.⁶ .................................................... F02M 41/00
[52] U.S. Cl. ......................... 123/463; 123/497; 137/468
[58] Field of Search .................................. 123/497, 463, 123/516, 381; 137/505.14, 468

[56] References Cited

U.S. PATENT DOCUMENTS

| | | | |
|---|---|---|---|
| 2,917,110 | 12/1959 | Brohl | 123/516 |
| 3,428,251 | 2/1969 | Gross | 137/468 |
| 3,587,963 | 6/1971 | Meuledyk | 137/468 |
| 4,050,431 | 9/1977 | Jackson | 123/464 |
| 4,142,677 | 3/1979 | Ludwig | 137/468 |
| 4,774,923 | 10/1988 | Hayashi | 123/463 |
| 4,790,343 | 12/1988 | Mochizoki | 123/463 |
| 5,148,792 | 9/1992 | Tuckey | 123/497 |
| 5,265,644 | 11/1993 | Tuckey | 123/463 |
| 5,337,718 | 8/1994 | Tuckey | 123/464 |
| 5,361,742 | 11/1994 | Briggs | 123/497 |
| 5,394,900 | 3/1995 | Okuyama | 123/463 |

FOREIGN PATENT DOCUMENTS

| | | | |
|---|---|---|---|
| 3238106 | 4/1984 | Germany | 123/464 |

*Primary Examiner*—Carl S. Miller
*Attorney, Agent, or Firm*—Barnes, Kisselle, Raisch, Choate, Whittemore & Hulbert

[57] ABSTRACT

A fuel pressure regulator for an internal combustion engine fuel delivery system that includes a flexible diaphragm carried within a housing to define first and second chambers on opposed sides of the diaphragm. The first of the housing chambers includes an inlet for connection to a source of fuel under pressure, an outlet for connection to the fuel rail and fuel injectors or other fuel delivery mechanism at the engine, and a valve associated with the inlet and movable responsive to the diaphragm between open and closed positions to control flow of fuel through the first chamber to the engine. A bimetallic element is disposed within the housing coupled to the valve and responsive to temperature of fuel in the housing for positioning the valve in the open position when temperature of fuel in the first chamber reaches a preselected level. Thus, under hot-soak or other high fuel temperature conditions, the fuel rail at the engine is connected directly to the fuel supply line for maintaining elevated fuel pressure and preventing fuel vaporization, and possible vapor lock and stall at the engine.

7 Claims, 2 Drawing Sheets

TEMPERATURE-RESPONSIVE DEMAND FUEL PRESSURE REGULATOR

This application is a continuation-in-part of application Serial No. 08/181,848 filed on Jan. 14, 1994, now U.S. Pat. No. 5,458,104.

The present invention relates to fuel delivery systems for internal combustion engines, and more particularly to a demand fuel pressure regulator for use in such fuel delivery systems.

BACKGROUND AND OBJECTS OF THE INVENTION

It has heretofore been proposed to supply fuel to an internal combustion engine by means of a pressure-controlled electric-motor fuel pump and a one-way or non-return fuel line that connects the pump to a fuel rail and fuel injectors at the engine. A problem encountered with returnless fuel delivery systems of the described character is encountered during so-called hot soak conditions when the engine has been idling or running at low speed, especially during hot weather conditions, or when a hot engine is turned off. The high temperature of the fuel in the fuel rail, coupled with high ambient temperature conditions, causes the fuel trapped in the fuel rail to expand. Increased fuel pressure in the fuel rail helps prevent vaporization of fuel, which could otherwise result in vapor lock when the engine is restarted. However, when the engine is restarted, pressure in the fuel rail suddenly decreases, and can result in fuel vaporization, vapor lock and stalling of the engine. It is therefore important under such conditions to maintain high fuel pressure in the fuel rail after the engine has started and until the fuel has an opportunity to cool.

Parent application Ser. No. 181,848 discloses a returnless fuel delivery system for an internal combustion engine in which fuel under pressure is delivered by an electric-motor fuel pump through a fuel demand pressure regulator to the fuel rail and fuel injectors at the engine. Fuel is delivered to the demand regulator at substantially constant pressure (e.g., at 55 psig) by varying speed of the fuel pump as a function of fuel demand at the engine. The demand regulator has a housing with a flexible diaphragm that defines first and second chambers within the housing. Flow of fuel through the first chamber from the pump to the fuel rail (e.g., at 50 psig) is controlled by a valve coupled to the diaphragm. Under some operating conditions with the valve closed, fuel trapped between the valve and the fuel rail can expand and displace the diaphragm away from the valve so as to accommodate expansion of the fuel. In the preferred embodiments, the second chamber of the demand regulator is coupled to the engine air intake manifold so as to maintain substantially constant fuel pressure differential across the injectors under normal operating conditions. In one embodiment, a solenoid carried by the demand regulator housing is responsive to a temperature sensor at the fuel rail for opening the regulator valve and coupling the fuel rail directly to the fuel supply line so as to maintain elevated fuel pressure at the fuel rail and prevent fuel vaporization when temperature of fuel at the fuel rail increases to a preselected level (e.g., 170° F.).

Although the fuel delivery system and fuel demand pressure regulator disclosed in the parent application address and overcome many difficulties theretofore extant in the art, further improvements remain desirable. In particular, the temperature sensor and solenoid valve disclosed in the parent application for opening the regulator valve when fuel temperature reaches a preselected level greatly increases the manufacturing cost of the demand pressure regulator and fuel delivery system. It is therefore a general object of the present invention to provide a fuel demand pressure regulator of the type disclosed in the above-noted parent application having facility for positioning the valve element in the open position, so as to couple the fuel supply line directly to the fuel rail and thereby maintain elevated pressure at the fuel rail to prevent fuel vaporization, when fuel temperature reaches a preselected level. Another and related object of the present invention is provide a demand pressure regulator and fuel delivery system of the described character that is less expensive to manufacture than heretofore proposed.

SUMMARY OF THE INVENTION

A fuel pressure regulator for an internal combustion engine fuel delivery system in accordance with the present invention includes a flexible diaphragm that is carried within a housing to define first and second chambers on opposed sides of the diaphragm. The first of the housing chambers includes an inlet for connection to a source of fuel under pressure, an outlet for connection to the fuel rail and fuel injectors or other fuel delivery mechanism at the engine, and a valve associated with the inlet and movable responsive to the diaphragm between open and closed positions to control flow of fuel through the first chamber to the engine. A bimetallic element is disposed within the housing coupled to the valve and responsive to temperature of fuel in the housing for positioning the valve in the open position when temperature of fuel in the first chamber reaches a preselected level (e.g., 190° F.). Thus, under hot-soak or other high fuel temperature conditions, the fuel rail at the engine is connected directly to the fuel supply line for maintaining elevated fuel pressure and preventing fuel vaporization, and possible vapor lock and stall at the engine.

In one embodiment of the invention, the bimetallic element comprises a bimetallic spring responsive to fuel temperature for urging the valve toward the open position. The spring may comprise a bimetallic leaf spring cantilevered from the regulator housing, although other spring configurations such as snap disks are also contemplated. In a second embodiment of the invention, the bimetallic element comprises a split bimetallic ring that encircles the valve within an annular chamber in the housing for gripping the valve and thereby frictionally holding the valve in the open position under hot fuel conditions. In either case, when fuel temperature decreases, the bimetallic element returns to normal operation, and operation of the demand pressure regulator is as set forth in the parent application.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The disclosure of parent application Ser. No. 08/181,848 is incorporated herein by reference.

Figure 1:
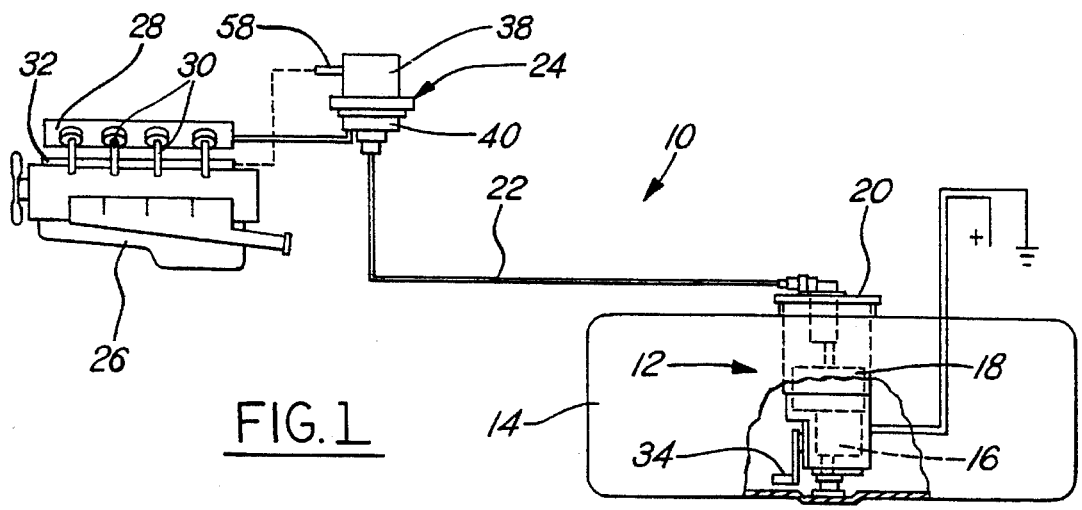
FIG. 1 is a schematic diagram of a non-return fuel delivery system embodying a demand pressure regulator in accordance with one presently preferred embodiment of the invention.

FIG. 1 illustrates a returnless fuel delivery system 10 in which a fuel pump module 12 is mounted within a fuel tank 14. Fuel pump module 12 includes an electric motor 16 supplied with electrical power, either directly or through a suitable pump control circuit. Motor 16 is coupled to a pump 18 for supplying fuel under pressure through a manifold 20 and a fuel supply line 22 to a fuel demand pressure regulator 24, which preferably is mounted on or adjacent to the engine 26. The fuel outlet of regulator 26 is connected to a fuel rail 28, and thence to individually controlled fuel injectors 30. The reference input to regulator 24 preferably is coupled to the combustion air intake manifold 32 of engine 26. Fuel pump module 12 also includes a fuel level sensor 34 for indicating level of fuel remaining in tank 14.

Figure 2:
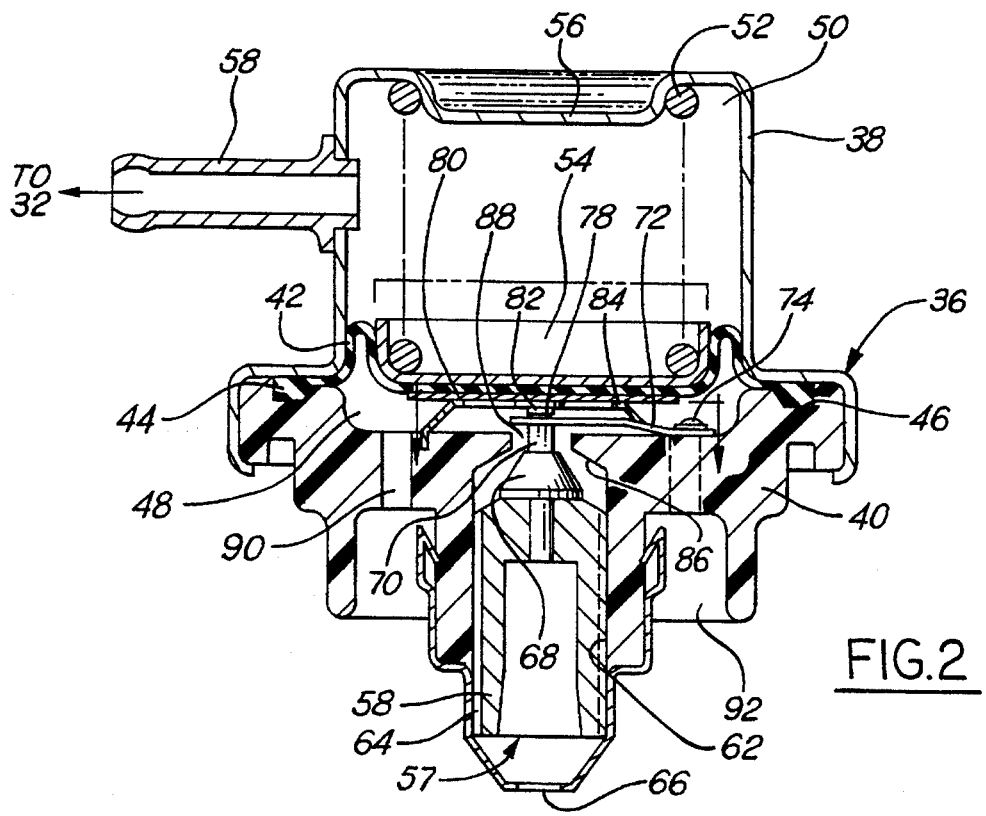
FIG. 2 is an elevational view that diametrically bisects the demand pressure regulator in the embodiment of FIG. 1.
Figure 3:
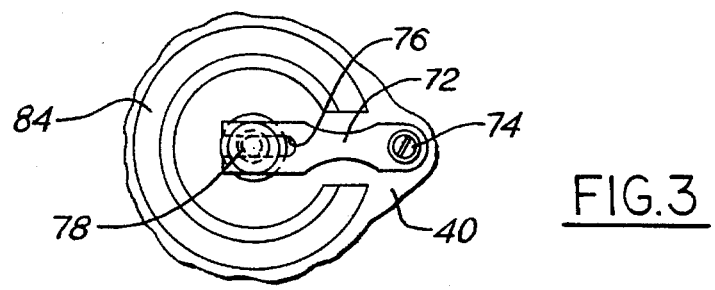
FIG. 3 is a fragmentary sectional view taken substantially along the line 3—3 in FIG. 2.
Figure 4:
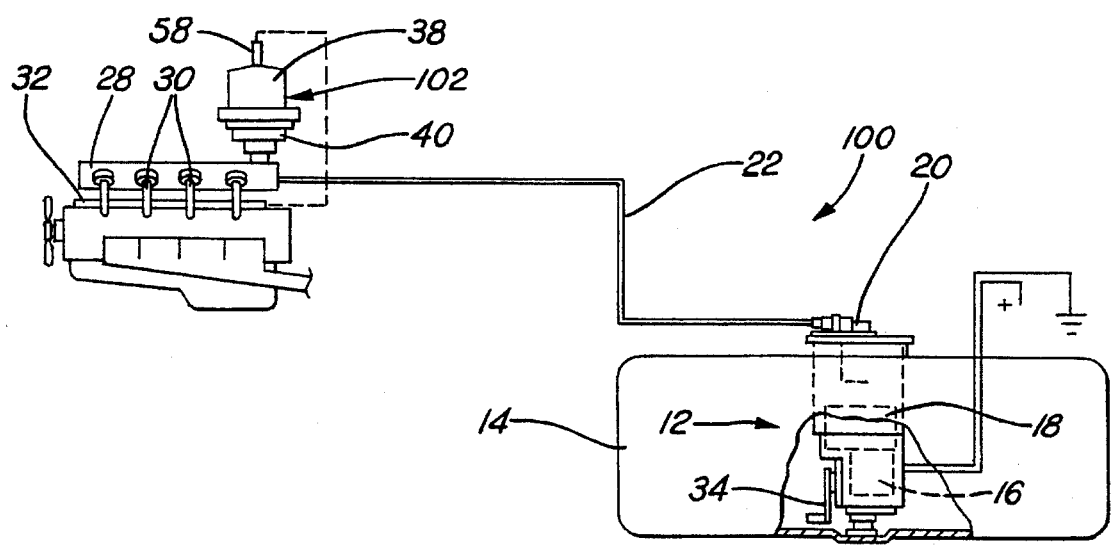
FIG. 4 is a schematic diagram that illustrates a returnless fuel delivery system having a demand pressure regulator in accordance with a second embodiment of the invention.

Referring to FIGS. 2 and 3, demand pressure regulator 24 includes a housing 36 formed by a shell 38 having an open edge crimped or otherwise formed over the outer periphery of a base 40. A flexible diaphragm 42 has an outer bead 44 captured by shell 38 within a corresponding annular channel 46 around the periphery of base 40. Diaphragm 42 thus cooperates with housing 36 to define a first chamber 48 between diaphragm 42 and base 40, and a second chamber 50 between diaphragm 42 and shell 38. A coil spring 52 is captured in compression within chamber 50 between a spring retainer 54 in engagement with the central portion of diaphragm 42, and an opposing depression 56 in shell 38. A fitting 58 is affixed to shell 38 for coupling chamber 50 to engine air intake manifold 32. The forces applied to diaphragm 42 within chamber 50 thus comprise the sum of the forces applied by coil spring 52 and pressure on the diaphragm from air intake manifold 32. It will be appreciated, of course, that the reference pressure supplied to chamber 50 may be obtained from other sources, such as ambient air, although coupling of chamber 50 to the engine air intake manifold is preferred for maintaining constant fuel pressure differential across injectors 30 (FIG. 1), as noted in the parent application.

A valve assembly 57 includes a cup-shaped valve element 58 slidably captured by a retainer 60 within a bore 62 centrally disposed in base 40. Valve element 58 has a multiplicity of longitudinally extending notches or grooves 64 disposed in an angularly spaced circumferential array around the outer periphery of the valve element. These notches or grooves 64 cooperate with the surrounding surface of bore 62 to define a multiplicity of fuel flow passages around valve element 58. A valve inlet opening 66 is disposed at the end of valve retainer 60. A valve head 68 is affixed to one end of valve element 58. A shaft 70 extends from valve head 68 away from valve element 58 and toward diaphragm 42 within regulator chamber 48. A bimetallic leaf spring 72 is affixed at one end to housing 40 within chamber 48 by a screw 74, and is cantilevered therefrom over valve assembly 57. A slot 76 at the free end of leaf spring 72 is disposed within and slidably engages an annular slot or recess 78 at the free end of shaft 70. A plate 80 is affixed to the central portion of diaphragm 42 within chamber 48, and carries a button 82 for opposed abutting engagement with shaft 70 of valve assembly 57. An arcuate ledge 84 is carried by base 40 surrounding shaft 70 to limit motion of diaphragm 42 toward base 40. The base 40 tapers around shaft 70 to form a conical valve seat 86 and an annular passage 88 into chamber 48. A circumferential array of fuel outlet passages 90 extend from chamber 48 to an annular recess 92 in base 40, which preferably communicates with fuel rail 28 (FIG. 1).

During normal operation, bimetallic spring 72 urges valve assembly 57 upwardly against diaphragm 42, and thus opposes the combined force of spring 52 and reference pressure within chamber 50. The forces applied by springs 52, 72 are selected such that fuel is metered to the fuel rail as demanded at the fuel rail for desired engine operation, and to maintain constant fuel pressure differential (e.g., 50 psig) across fuel injectors 30. However, in the event of hot fuel conditions within chamber 48, due to hot-soak engine conditions or other reasons, bimetallic spring 72 operates to open the fuel valve as shown in FIG. 2 when the fuel temperature reaches the temperature threshold of the bimetallic spring (e.g., 190° F.). That is, when fuel temperature reaches the threshold of bimetallic spring 72, spring 72 urges valve assembly 57 downwardly as viewed in FIG. 2, so as to open the valve.

Thus, even under extreme high temperature conditions in which fuel expansion lifts diaphragm 42 off of support 84, bimetallic spring 72 prevents valve assembly 57 from following the diaphragm, and maintains the open condition of the valve as shown in FIG. 2 independent of diaphragm operation. In this way, fuel at the output pressure of pump 12 is applied directly to the fuel rail so as to maintain elevated pressure at the fuel rail and help prevent vaporization of the fuel. When flow of fuel through regulator 24 cools bimetallic spring 72, the spring returns to normal operation as described above. Thus, spring 72 functions automatically to open the regulator valve as temperature increases above the temperature threshold at which the bimetallic properties of the spring begin to take affect. The functional relationship between spring operation and fuel flow verses temperature above this threshold—e.g., linear, non-linear, step-function, etc.—are determined by design of spring 72.

FIGS. 4–7 illustrate a fuel delivery system 100 and a demand pressure regulator 102 in accordance with a modified embodiment of the invention. Reference numerals in FIGS. 4–7 identical to those employed in conjunction with FIGS. 1–3 indicate identical parts or elements. Only the differences between regulator 102 in FIGS. 4–7 and regulator 24 in FIGS. 1–3 will be described in detail.

Figure 5:
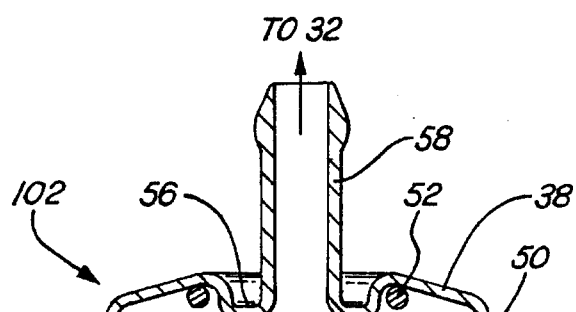
FIG. 5 is an elevational view that diametrically bisects the pressure regulator in the system of FIG. 4.
Figure 6:
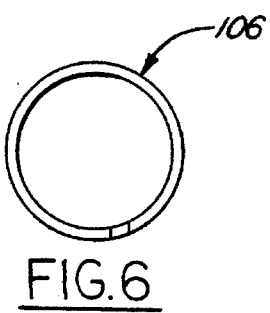
FIG. 6 is a plan view of the bimetallic clamp element in the regulator of FIG. 5.
Figure 7:
FIG. 7 is an elevational view of the bimetallic clamp illustrated in FIG. 6.

In regulator 102 as shown in FIG. 5, a coil spring 104 is captured in compression between retainer 60 and cup-shaped valve element 58 surrounding fuel inlet 66. Coil spring 104 thus opposes the forces applied by spring 52 and air pressure from engine air intake manifold 32 within regulator chamber 50. A split bimetallic ring 106 (FIGS. 5–7) is disposed within an annular chamber 108 in base 40 surrounding valve assembly 57, which is slidably disposed within bore 62 of base 40. During normal operation when the fuel flowing through regulator 102 past ring 106 is relatively cool, ring 106 is expanded as illustrated in FIG. 5, and valve assembly 57 is free to slide within bore 62. That is, at normal operating temperatures, ring 106 has no effect upon operation of regulator 102.

However, when the temperature of fuel within housing 36 increases to the threshold temperature of ring 106, such as a temperature of 190° F., ring 106 closes around valve element 58 frictionally to engage the outer periphery of the valve element and thereby retard sliding motion of the valve assembly within bore 62. When the engine is then started, fuel pressure within chamber 48 instantaneously decreases due to operation of the fuel injectors, and the force applied to diaphragm 42 by spring 52 is sufficient to overcome the frictional forces applied by clamp ring 106 and open the control valve. Thereafter, frictional engagement of clamp ring 106 is sufficient to hold the valve open against the force applied by spring 104, and thereby to connect pump outlet pressure directly to the fuel rail. This increase in pressure at the fuel rail prevents fuel vaporization, and vapor lock and stall at the engine, under high temperature conditions. When flow of fuel through regulator 102 is sufficient to return fuel temperature to the normal operating range, bimetallic clamp ring 106 again expands, and operation returns to normal.

I claim:

1. A pressure regulator for an internal combustion engine fuel delivery system that comprises:

a housing and a flexible diaphragm carried within said housing to define first and second chambers on opposed sides of said diaphragm, a first of said chambers including inlet means for connection to a source of under pressure, outlet means for connection to fuel delivery means at the engine, and valve means associated with said inlet means and movable responsive to said diaphragm between open and closed positions to control flow of fuel through said first chamber between said inlet and outlet means, and a bimetallic leaf spring disposed within said housing, fastened at one end to said housing and coupled at an opposing end to said valve means, and responsive to the temperature of fuel in said housing for urging said valve means toward said open position when temperature of fuel in said housing reaches a preselected level.

2. A pressure regulator for an internal combustion engine fuel delivery system that comprises:

a housing and a flexible diaphragm carried within said housing to define first and second chambers on opposed sides of said diaphragm, a first of said chambers including inlet means for connection to a source of fuel under pressure, outlet means for connection to fuel delivery means at the engine, and valve means associated with said inlet means and movable responsive to said diaphragm between open and closed positions to control flow of fuel through said chamber between said inlet and outlet means, and a leaf spring disposed within said housing fastened at one end to said housing and coupled at an opposing end to said valve means, said leaf spring being of a construction responsive to the temperature of fuel in said housing for urging said valve means toward said open position when temperature of fuel in said housing reaches a preselected level.

3. A pressure regulator for an internal combustion engine libel delivery system that comprises:

a housing and a flexible diaphragm carried within said housing to define first and second chambers on opposed sides of said diaphragm, a first of said chambers including inlet means for connection to a source of fuel under pressure, outlet means for connection to fuel delivery means at the engine, and valve means associated with said inlet means and movable responsive to said diaphragm between open and closed positions to control flow of fuel through said first chamber between said inlet and outlet means, and a bimetallic clamp disposed within said housing coupled to said valve means and responsive to the temperature of fuel in said housing for engaging said valve means and holding said valve means in said open position when temperature of fuel in said housing reaches a preselected level.

4. A pressure regulator for an internal combustion engine fuel delivery system that comprises:

a housing and a flexible diaphragm carried within said housing to define first and second chambers on opposed sides of said diaphragm, a first of said chambers including inlet means for connection to a source of fuel under pressure, outlet means for connection to fuel delivery means at the engine, and valve means associated with said inlet means and movable responsive to said diaphragm between open and closed positions to control flow of fuel through said first chamber between said inlet and outlet means, and a clamp disposed within said housing and coupled to said valve means, said clap being of a construction responsive to the temperature of fuel in said housing for engaging said valve means and holding said valve means in said open position when temperature of fuel in said housing reaches a preselected level.

5. The regulator set forth in claim 4 wherein said clamp comprises a split ring disposed within an annular chamber in said housing encircling said valve means and being responsive to temperature of fuel in said housing for contracting frictionally to engage said valve means.

6. A pressure regulator for an internal combustion engine fuel delivery system that comprises:

a housing and a flexible diaphragm carried within said housing to define first and second chambers on opposed sides of said diaphragm, a first of said chambers including inlet means for connection to a source of fuel under pressure, outlet means for connection to fuel delivery means at the engine, and valve means associated with said inlet means and movable responsive to said diaphragm between open and closed positions to control flow of fuel through said first chamber between said inlet and outlet means, and temperature-responsive clamp means disposed within said housing coupled to said valve means and responsive to temperature of fuel in said housing for engaging said valve means and holding said valve means in said open position when the temperature of fuel in housing reaches a preselected level.

7. The regulator set forth in claim 3 wherein said bimetallic clamp comprises a split bimetallic ring disposed within an annular chamber in said housing encircling said valve means and being responsive to temperature of fuel in said housing for contracting frictionally to engage said valve means.

\* \* \* \* \*

UNITED STATES PATENT AND TRADEMARK OFFICE
CERTIFICATE OF CORRECTION

PATENT NO. : 5,509,390
DATED : April 23, 1996
INVENTOR(S) : Charles H. Tuckey

It is certified that error appears in the above-indentified patent and that said Letters Patent is hereby corrected as shown below:

Col. 6, Line 27, change "clap" to "clamp".

Signed and Sealed this

Thirteenth Day of August, 1996

Attest:

BRUCE LEHMAN

*Attesting Officer*     *Commissioner of Patents and Trademarks*